G. P. VAN WYE.
VACUUM INSULATED BOTTLE.
APPLICATION FILED JUNE 30, 1908.
917,816.
Patented Apr. 13, 1909.
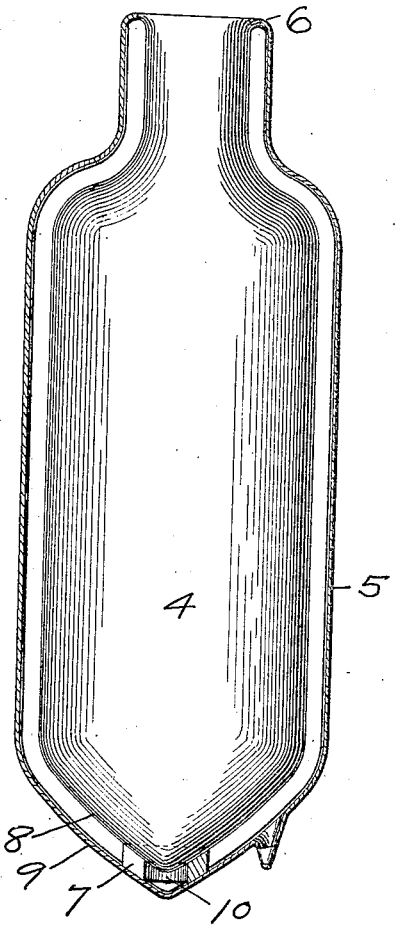
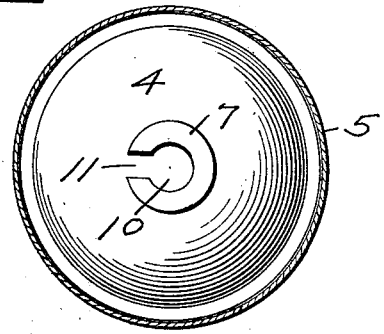
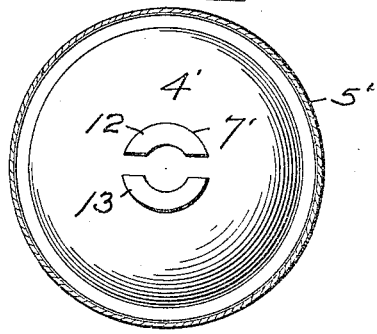
WITNESSES:
INVENTOR
Garry P. Van Wye.

UNITED STATES PATENT OFFICE.

GARRY P. VAN WYE, OF NEW YORK, N. Y.

VACUUM-INSULATED BOTTLE.

No. 917,816.  Specification of Letters Patent.  Patented April 13, 1909.

Application filed June 30, 1908. Serial No. 441,211.

*To all whom it may concern:*

Be it known that I, GARRY P. VAN WYE, a citizen of the United States, residing at New York, in the county and State of New York, have invented a new and useful Vacuum-Insulated Bottle, of which the following is a specification.

This invention relates to vacuum insulated bottles, and has for its object to provide a bottle having walls specially constructed to enable the support to readily engage the same as a brace as well as a support. In constructing these bottles it has been customary to make the bottom of the inner part, or wall, round, and make the outer wall conform thereto in contour. When the asbestos block, or support was mounted between the bases it was difficult to make the support act as a brace unless the inner wall, or both walls were provided with a projection which would engage the block; or, unless the block was made of considerable size.

It is the object of my invention to make the walls of a slightly conical shape so that the support will engage the same as a brace even if comparatively small.

The invention is illustrated in the accompanying drawing, in which—

Figure 1, is an elevation of the inner part, or wall of a bottle constructed according to my invention, and a sectional view of the outer part, or wall; Fig. 2, is a bottom plan view thereof, the outer wall being in section; and Fig. 3, is a view similar to Fig. 2, but showing a modified form of support.

In the drawing the several parts of my invention are indicated by numerals of reference, and in practice I provide a double walled vessel comprising an inner wall 4, and an outer wall 5, the two being joined together at the lip 6; while a support and brace 7, is mounted between the bases of the two walls to mutually support and brace the walls against any sudden shock, or jar.

In order that the support may engage the walls efficiently as a brace without being excessive in size, the inner wall is made slightly conical, as shown at 8, and the outer wall is also made conical, as shown at 9, whereby the support 7, will engage both walls in a lateral direction as well as a vertical direction, as clearly shown in Fig. 1, and the inner part will be braced as well as supported, even when the block 7, is comparatively small. It is evident that this support 7 would act in the same way even if solid, or in the shape of a disk, as the edges would turn up between the slanting base walls; but as these blocks yield up considerable gas when the bottles are being evacuated, it is desirable to have as little asbestos as possible between the walls, hence I prefer to cut out the center of the support, as shown at 10, thereby making the support ring-shaped; and in order to allow the silvering solution to enter this ring to coat the walls of the bottle, I provide an opening 11, in one side of this ring, as clearly shown in Fig. 2.

In Fig. 3, I have shown a slightly modified form of support, in which the support 7' is practically provided with two openings, thereby forming the support in two parts 12, and 13. This form will allow the silvering solution to be drained from the center of the support more readily than where an opening is provided on one side only; and also reduces the amount of asbestos required without materially weakening the supporting and bracing of the walls.

Having thus described my invention, what I claim as new and desire to secure by Letters Patent of the United States is:

1. A vacuum insulated bottle comprising a double walled vessel, the walls of which have conical-shaped bases, and a support mounted on the apex of the inner base wall, and engaging the slanting sides of both walls.

2. A vacuum insulated bottle comprising a double walled vessel, the walls of which have conical-shaped bases, and a support mounted around the apex of the inner wall and engaging the slanting side of the outer wall, said support being ring-shaped, and having an opening in one side thereof.

In testimony whereof I have hereunto subscribed my name in the presence of two subscribing witnesses.

GARRY P. VAN WYE.

Witnesses:
ADELE V. JUILLERAT,
C. H. BERTHOFF.